United States Patent [19]

Georgiou et al.

[11] Patent Number: 5,008,520
[45] Date of Patent: Apr. 16, 1991

[54] METHOD AND APPARATUS FOR READING A BAR CODE ON A MOVING SHEET

[76] Inventors: John Georgiou, 250 Glover Ave. #43, Norwalk, Conn. 06850; Thomas F. Gueth, 43 Whippoorwill Rd., Bethel, Conn. 06801; James S. Ramsey, 75 Nicholdale Rd., Shelton, Conn. 06484

[21] Appl. No.: 269,390
[22] Filed: Nov. 10, 1988
[51] Int. Cl.$^5$ ............................................. G06F 7/10
[52] U.S. Cl. .................................. 235/462; 235/376; 235/449; 235/467
[58] Field of Search ............... 235/376, 449, 467, 462; 211/10, 178

[56] References Cited

U.S. PATENT DOCUMENTS

| | | | |
|---|---|---|---|
| 3,949,363 | 4/1976 | Holm | 235/449 |
| 4,126,779 | 11/1978 | Jowers et al. | 235/376 |
| 4,417,136 | 11/1983 | Rushby | 235/376 |
| 4,570,922 | 2/1986 | Akers | 271/178 |
| 4,607,833 | 8/1986 | Svyatsky | 271/10 |
| 4,820,911 | 4/1989 | Arackellian | 235/467 |

Primary Examiner—Harold Pitts
Attorney, Agent, or Firm—Melvin J. Scolnick; David E. Pitchenik; Peter Vrahotes

[57] ABSTRACT

Apparatus and method have been conceived whereby cut sheets having a bar code printed thereon can be read while such sheets are moving. A fixed scanner for reading the bar code has an elongated window such that a light beam being generated by the scanner will have a width that is no greater than the width of the smallest space between adjacent bars of the symbol. Because of the elongated configuration of the light beam, sufficient reflectivity occurs such that a good reading can be obtained with the use of such a fixed beam scanner.

16 Claims, 5 Drawing Sheets

METHOD AND APPARATUS FOR READING A BAR CODE ON A MOVING SHEET

BACKGROUND OF THE INVENTION

In recent decades, the reading of code symbols printed onto a medium is coming into more frequent use. Examples of such reading of code symbols includes the use of a wand by a store clerk for the purpose of reading a code symbol on a ticket, tag or label. The code symbol can be either in the form of a bar code or dash code, or an alpha numberic code can be printed on the medium. The reading of bar code symbols with wands is quite common in establishments such as department stores. Another example of the use of bar codes and the reading thereof is in grocery stores. A counter can be fashioned with a generally x-shaped window under which is a flying spot scanner is located. By flying spot scanner is meant a device in which a beam of light is generated by a laser device and is caused to move within the area of the window for the purpose of reading a bar code symbol located on an article that is moved across the window by a clerk.

Another particular type of activity where a code on a medium is coming into wider use is in the processing of mail, particularly in the processing of mail by an apparatus that includes an inserter. Examples of inserters are the Model 8300 Series inserters available from Pitney Bowes Inc., Stamford, Ct. In such inserters, it is frequently a practice to stack cut sheets with a code thereon. The cut sheets are fed sequentially and the code thereon read to determine how many of the sheets are to be placed within a given envelope. Once a determination is made as to how many sheets are to be fed together, then they were subsequently folded and inserts from feeding bins are added to the sheet or sheets and eventually the bundle is inserted into an envelope.

In order for the process to be efficient, the cut sheet should be read while moving. Reading a code on a moving sheet presents more problems than reading a code on a stationary sheet, and prior devices were unable to read bar code symbols printed on sheets with sufficient speed. As a consequence, what has used previously as a code on a cut sheet was a dash code. Although a dash code can be read on the fly, the disadvantage of such a code is that it does not contain as much information as a bar code. The information to be given by a dash code is generally only concerned with the sheets that are to be inserted into a single envelope and the inserts from the feeds that would accompany such sheets upon insertion. Because of the limitations of the capacity of the dash code, little information in addition to this could be obtained. Clearly, it would be advantageous to be able to have an apparatus capable of reading a bar code symbol on a rapidly moving sheet so that greater information can be obtained.

SUMMARY OF THE INVENTION

Apparatus and method have been conceived whereby sheets having a bar code symbol printed thereon can be read while such sheets are moving at a relatively high speed. The sheets can either be cut sheets or parts of a web that is subsequently ruptured. By high speed is meant in the neighborhood of 120 inches/sec. and higher. A fixed beam scanner was used for reading the bar code symbol which scanner has an elongated window such that the light beam being generated thereby will have a width that is no greater than the width of the smallest space between bars of the symbol. Because of the elongated configuration of the light beam, sufficient reflectivity occurs so that an accurate reading can be obtained with the use of a fixed beam scanner.

DETAILED DESCRIPTION OF THE PREFERRED EMBODIMENTS

Figure 1:
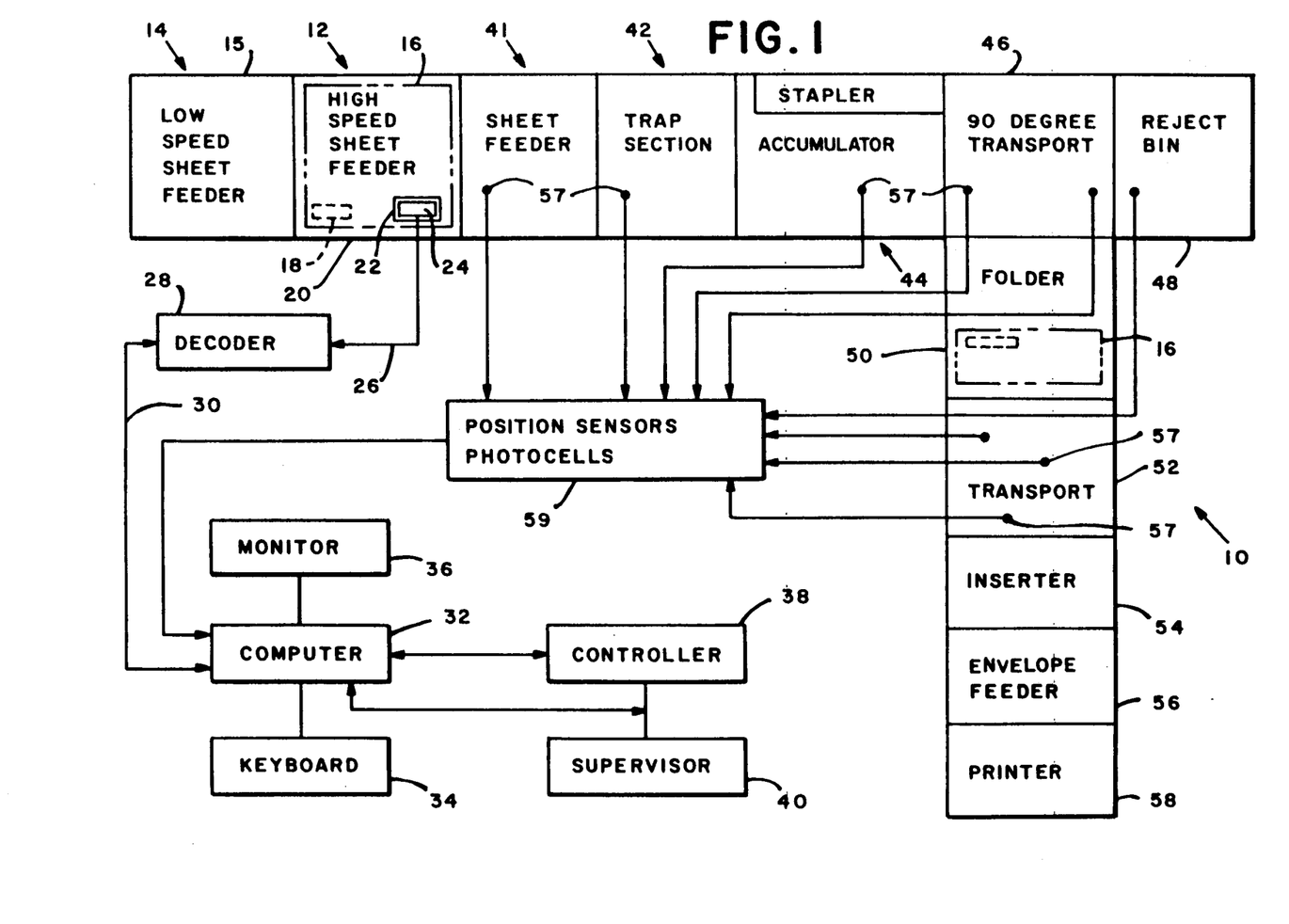
FIG. 1 is a schematic, plan view of an inserter system in which the instant invention can be practiced.
Figure 2:
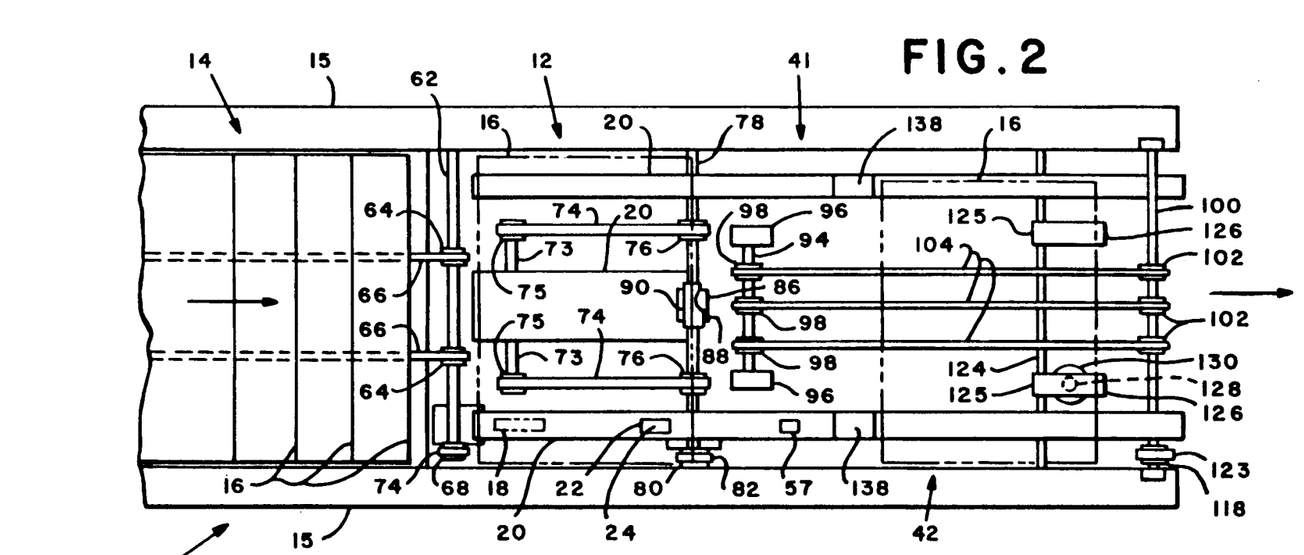
FIG. 2 is a plan view of a portion of the apparatus shown in FIG. 1.
Figure 3:
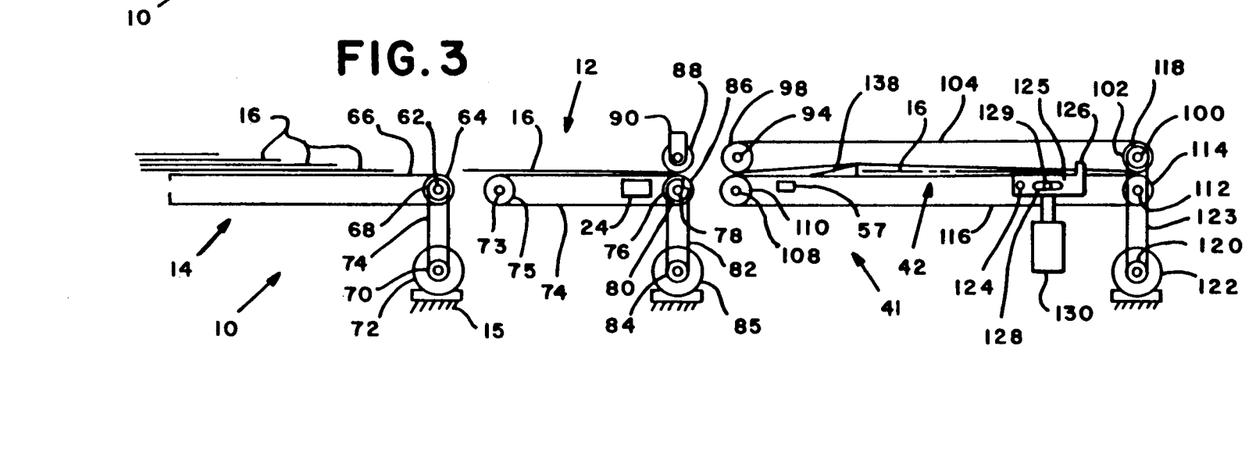
FIG. 3 is a cross-sectional view of the apparatus portion shown in FIG. 2.

Referring initially to FIGS. 1-3, an inserter system that incorporates features of the instant invention is shown generally at 10. This inserter system 10 includes a high speed sheet feeder 12 that is capable of conveying articles at a speed of approximately 120 inches/seconds. Optionally, upstream from the high speed sheet feeder 12 is a low speed sheet feeder 14 that feeds a stack of sheets 16 to the high speed sheet feeder. Both the high speed sheet feeder 12 and low speed sheet feeder 14 are supported by a frame 15 that also supports members of the inserter system downstream therefrom. The high speed sheet feeder 12 has a three piece deck 20 that is supported by the frame 15 and one member of such three piece deck has an opening 22 therein. In registration with such opening is a fixed beam scanner 24 positioned so as to direct a beam of light through the opening 22. An example of a fixed beam scanner 24 suitable for the instant invention is available from Scan-A-matic, Inc., and identified as Model S23005 scanner. This is a light emitting diode (LED) device that emits an infrared beam. A lead 26 connects the scanner 24 with a decoder 28 such as a Scan-A-Matic Model D20118 decoder. The decoder 28 in turn is connected by a lead 30 to a computer 32, such as a Compaq DESKPRO 386 computer. The computer 32 has a keyboard 34 and display 36, or monitor, and is in communication with a controller 38 and a supervisor computer 40 which can be an Intel 80/204 single board computer.

Downstream from the high speed sheet feeder 12 is a sheet feeder 41 that conveys a single sheet fed by the high speed sheet feeder, as will be described hereinafter, through a trap 42 that holds a sheet until collation is finished further downstream. The sheets are then accumulated in an accumulator 44 where collated sheets would be stapled or stacked, moved on to a 90° transport 46. The sheets will be passed on to a diverter bin 48 if the sheets are too large to be folded. If the sheets are with size limits they will be transported to a folder 50 which is located at a right angle relative to the direction of sheet travel, as seen in FIG. 1. The sheet 16, or sheets, conveyed by the transported 46 would be folded by the folder 50. Downstream from the folder 50 is a transport 52 that conveys the sheet 16, or sheets, to an inserter feeder 54 wherein inserts would be added to the sheet, or sheets, and these would in turn be conveyed to an envelope feeder and inserter 56 wherein the sheets and the inserts would be inserted into an envelope. Adjacent to the envelope feeder and inserter 56 is a printing station 58 with a printer such as an ink jet printer whereby information such as the zip code can be printed on the envelope.

The various components photodetectors, 41,42,44,46 and 52 of the inserter system 10 have paired photodetectors such as a Scan-A-Matic Model L3307 and Model P3307 photodetectors. These detectors 57 are in with the computer; whereby, the presence of a sheet 16, or sheets, at the various locations can be determined as is known in the art. The leads from the various photocells are shown collectively at 59 for reasons of convenience.

Other than the opening 22 in the deck 20 of the high speed feeder 12, the scanner 24 in registration with such opening and the method of operating the same, all the transportation components are standard and do not form part of the invention, but are shown for the purpose of illustrating how the invention may be utilized. An example of an inserting system such as that just described is a Model 8300 Series Pitney Bowes inserter.

Referring now to FIGS. 2 and 3, details of portions of the system 10 shown in FIG. 1 will be given. The low speed sheet feeder 14 has a pair of shafts 62 (only one being shown) on opposite longitudinal ends thereof that are rotatably supported by the frame 15. Mounted on each of the shafts is a pair of pulleys 64 and the pulleys have a conveyor belt 66 trained thereabout. One of the shafts 62 has a pulley 68 located at one of its ends, and another pulley 70 is attached to the output shaft of a motor 72 that is supported by the frame 15. A drive belt 74 is trained about the pulleys 68,70 to provide drive to the conveyor belt 66. At the high speed feeder 12, a pair of stub shafts 73 are rotatably supported by the frame 15 and each has mounted thereon a pulley 75. A shaft 78 is rotatably supported by the frame 15 and has a pair of pulleys 76 mounted thereon in spaced, paired relationship with the pulleys 75. A conveyor belt 74 is trained about each of the pair of pulleys 75,76. Another pulley 80 is mounted at one end of the shaft 78 and a drive belt 82 is trained about such pulley and another pulley 84 mounted on the output shaft of a motor 85. The shaft 78 also has a roller 86 mounted thereon that is spaced relative to a stationary stone 88 that is attached to an arm 90 which is supported by the frame 15 in any convenient manner. Thus, a stack of sheets 16 can be placed upon the conveyor belts 66, preferably shingled as shown in FIG. 2, conveyed onto the conveyor belts 74 so that the stack will engage the stone 88. The distance between the stone 88 and roller 86 is just sufficient to allow the passage of a single sheet, the stone and roller acting to separate the bottom most sheet 16 of the stack as is known in the art.

Downstream from the roller 86 is the feeder 41 that is made up of a shaft 94 rotatably received within a bearing box 96 that is supported by the frame 15 and three pulleys 98 are mounted on the shaft. Another shaft 100 is rotatably supported by the frame 15 and also has three pulleys 102 mounted thereon that are in spaced, paired relationship with the pulleys 98. Three conveyor belts 104 are trained about the paired pulleys 98,102. Another shaft 108 is rotatably supported by the frame 15 below the shaft 94 and has three pulleys 110 (only one being shown) mounted thereon. Below the shaft 100 is another shaft 112 that has three pulleys 114 (only one being shown) attached thereto in a spaced, paired relationship with the pulleys 110. Trained about the paired pulleys 110,114 are three conveyor belts 116. The shaft 100 also has an end pulley 118 attached thereto. Located below the pulley 118 is a motor 122 that has a pulley 120 mounted on the output shaft thereof. A drive belt 123 is trained about the pulleys 118,120 for the purpose of providing drive to the belts 104, which because of the contact with the conveyor belts 116 will convey a sheet that is received between the belts 104,116 after being separated and removed from the stack of sheets by the roller 86 and stone 88. Another shaft 124 is rotatably supported by the frame and has a pair of links 125 thereon. Each of the links 125 has a finger 126 mounted at one end thereof. One of the links 125 has an opening 128 therein. A solenoid 130 is located below the shaft 124 and has a pin 129 secured thereto that is received within the opening of the one link 125 so as to rotate the shaft 124 upon actuation of the solenoid. Located outside the belts 104 are a pair of ramps 138 and upstream from the ramps 138 is a photodetector 57. The combination of ramp 138 and fingers 126 will act to hold a sheet at the trap section until sheets at the accumulator 94 are stapled. After stapling at the accumulator 94, the solenoid 130 is activated, the links 125 are rotated in a clockwise direction to lower the fingers 126 and the restrained sheet 16 is acted upon by the belts 104,116.

It should be noted that the apparatus shown in FIGS. 2 and 3 is shown and described is only for showing a mechanism capable of conveying sheets for the purpose of illustrating the invention. Consequently, the mechanisms are not shown in any greater detail than that required to demonstrate the transport of sheets. Reference can be had to U. S. Pat. No. 4,640,506 issued Feb. 3, 1987 to H. E. Luperti et al for further details of such a transport mechanism.

Figure 4:
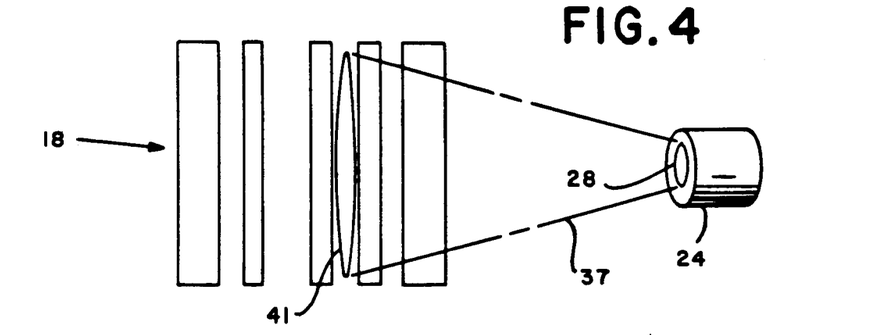
FIG. 4 shows a light beam being directed upon a bar code.

Referring now to FIG. 4, the light generating portion of the scanner 24 is shown directing a beam of light 37 upon a bar code symbol 18. The window of the scanner 24 has an elliptical shape so that the beam of light directed to the bar code symbol forms an elliptical image. The size of the beam and the distance of the scanner 24 from the bar code 18 is selected so that the maximum width of the light beam image 41 is no wider than the narrowest space between the bars, or the narrowest bar. What is demonstrated is a code known as code 39, which has a configuration wherein the wide bars and wide spaces are the same width, and the narrow bars and narrow spaces are of the same width. By having the light image 41 with a width no greater than the width of the smallest bar or space, one is able to obtain a precise reading as to whether a bar or space is being intercepted. More specifically, with this configuration, there is no overlap from one bar to another when the light beam is directed to a space. By having the light beam reelected from a space only, or from a bar only, i.e. no overlap, a more precise, i.e. reliable, reading can be attained. Although the window is shown as an oval shape, it will be appreciated that other convenient shape, such as a diamond shape, can be used. The primary recuirement is that the beam image 41 be substantially longer than wide. The reason that this particular configuration is of value is that more light is able to be shown upon a bar code symbol than if the light beam were circular in configuration. In addition, the elongated image would tend to give a more accurate reading of a bar. This is not only because it would cover more space, but because imperfections in a printed bar tend to be generally circular in nature. More specifically, there are times during printing where the black area is not filled in completely. Those areas that are not filled in completely tend to be circular. With the normal circular type of beam, the effect of a large imperfection may create an impression that the beam is reading a space whereas it is actually reading a bar. The same can be said about black spots in a space. With a circular cross-sectional beam, if the black spot is large enough, the decoder may register the presence of a bar rather than a space. By having the elongated image, the relative area of the bar or space having the imperfection is reduced, thereby reducing its probability of causing an error.

The particular light used with the scanner 24 was an infra-red beam from a light emitting diode device. This infra-red beam is satisfactory for detecting the presence of bar codes that are printed with carbon black ink and fluorescent inks. In some circumstances this may be advantageous. On the other hand, visible light can read not only carbon black ink, but dye based inks as well, and it may be that under other circumstances it may be more desirable to use a scanner that emits visible light.

Figure 5:
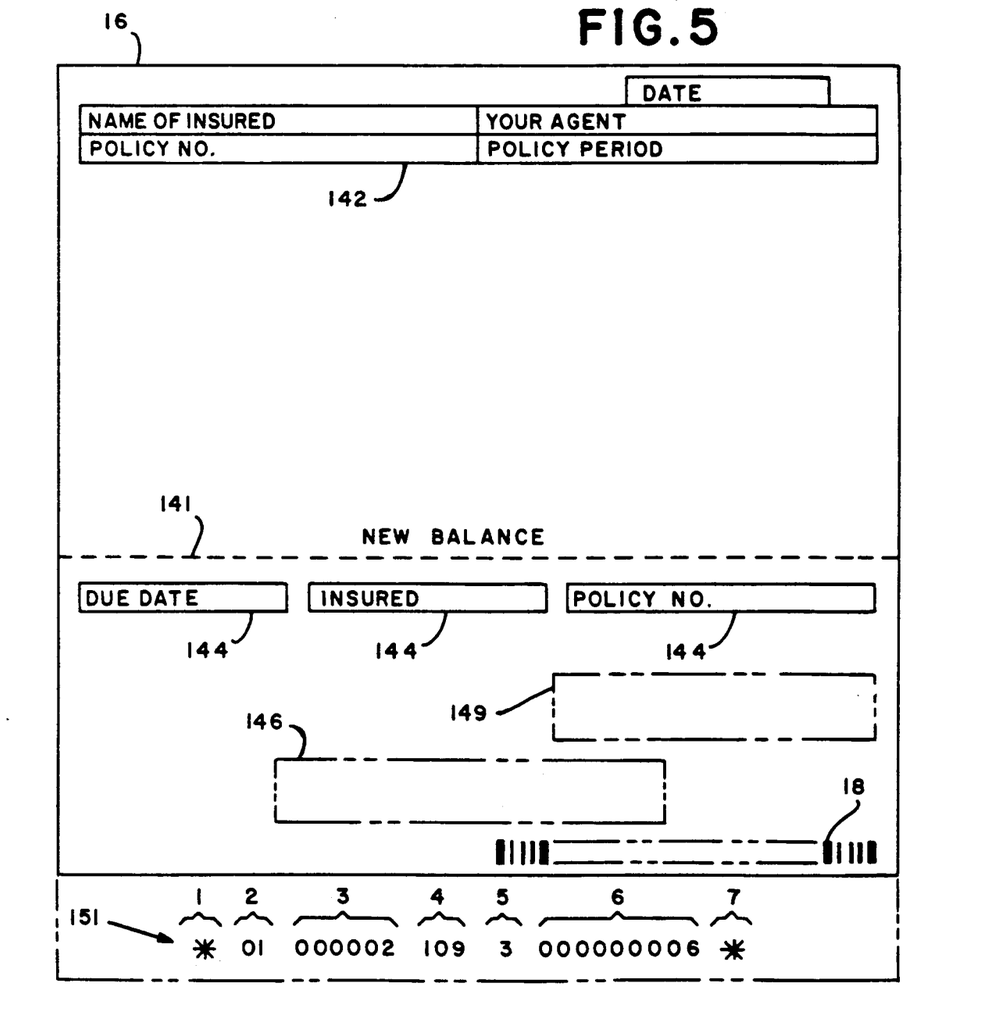
FIG. 5 is a plan view of a cut sheet that may be used in conjunction with the instant invention.

Referring now to FIG. 5, an example of a sheet is given that would be mailed by an insurance company. The sheet has a first block 142 for placing information therein relative to the name of the insured, the insurance agent, the policy number, the policy period, and the date. Below a fold line 141 is another set of blocks 144 that gives the date due for the premium, the name of the insured, and the policy number. The sheet also contains an address block 146 where the address of the recipient would be placed, and has the bar code symbol 18. Optionally, another address block 149 could be included that would have the return address of the sender that could be seen in a windowed envelope. As stated previously, the particular bar code symbol shown is a code 39 bar code which is shown figuratively at the lower right hand corner of the sheet 16 in FIG. 5. This bar code symbol contains 23 characters that are segregated into 7 sets, including sets of one, as seen at 151. The first and last set contains only one digit each that are start and stop symbols. The second set contains 2 digits and is used to indicate the page number of the sheet being fed. The third set is made up of 6 digits and represents a sequence number, a sequence number being assigned to each customer. More specifically, if a customer were to receive three sheets, the sheet would be numbered 1 through 3, and the sequence 30 number would be the same on all three sheets. When the next sheet, or set of sheets, is to be sent to a different customer, it will again have page numbers from 1 on, and a different sequence number. The fourth set, indicated by the number 109, is made up of three digits and represents the pocket of the bin to which the envelope containing the sheets is to be fed. The fifth set is a single digit, and this shows the postal discount applicable. The appropriate postal discount will depend upon how the mail is processed by the mailer, for example, if it is pre-sorted, pre-bar code printed on the envelope, and the like that reflect the postage rate to which the mailer is entitled. The penultimate set is made up of 9 characters and is the 9 digit zip code. It should be noted that the seven sets represent a large amount of information to be printed upon a sheet that is fed in a mail processing apparatus. With dash codes, the amount of information that could be obtained therefrom is much less.

In operation a stack of sheets would be placed upon the low speed sheet feeder 14 and conveyed to the high speed sheet feeder 12. This is optional as the stack of sheets may be placed directly upon the high speed sheet feeder 12, but because of the high speed of the latter, it is preferable to place a stack of sheets on the low speed feeder 14. Preferably, the sheets are shingled before or after they are placed upon the low speed sheet feeder 14. The sheets 16 are placed upon the sheet feeder 14 in such a way that the bar code symbol 18 is located upstream end and in line with the scanner 24. With the sheets 16 in position, the motors 72,85 and 122 would be enabled. Initially, the sheets 16 are fed onto the high speed feeder 14 and fed at a speed of at least 120 inches/sec. to the nip between the stone 88 and the roller 86 which are separated from one another a distance that conveniently allows the passage of a single sheet. Because of the presence of the stone 88, the roller 90 would tend the feed only the bottom most sheet. As the bottom-most sheet 16 is being fed, the bar code symbol 18 would pass over the opening 22 and the scanner 24 would direct the beam of light 37 onto the bar code symbol 18 from which it would be reflected back to the scanner. The bar code 18 would be read by the scanner 24 and the information in the form of an analog signal is received by the decoder 28. The decoder 28 converts the analog signal to a digital signal and transforms that data 35 into an ASCII code that is sent to the computer 32. The computer 32 also receives data from the photodetectors 57 thereby indicating to the computer the positions of the various sheets being fed.

As the sheets 16 are fed past the scanner 24, the bar code symbol 18 will be read and a determination made as to the identity of the customer and which of the sheets should be fed together. The sheets are then conveyed on to the accumulator 44 wherein they would come in contact with the fingers 128. If only one sheet is to be fed, the computer would cause the solenoid 130 to rotate the shaft 124, 180 degrees thereby allowing the sheet to be fed. If more than one sheet 116 is to be fed together, the first sheet would travel up the ramp 138 and be collected downstream from the ramp by contacting the fingers 126 when the fingers are in a blocking position. That sheet 16 will remain until all other sheets that are to accompany it are placed thereupon. When the last sheet of the set, as indicated by the sequence number, is collected, the computer 32 will cause the set to be stapled and the solenoid 130 to rotate the shaft 124, through contact with the links 125, thereby placing the fingers in an unblocking position. The set of stapled sheets will then be forwarded by the belts 104,116 to the transport 46. Assuming that the sheet, or sheets, are of a size such that they can be folded, the sheet will be rotated and conveyed to the folder 50. If the sheet is too large to be folded, it is not diverted and will be collected in a reject bin 48. After the sheet or sheets 16 are folded by the folder 50, they will then be transported to the inserter 54 wherein the inserts to be placed into the envelope with the sheets are fed thereupon. The feeding of such inserts and the manner in which they are selected is well known in the art and will not be described here. For information 30 relative to the operation of insert feeder stations, reference can be had to U. S. Pat. No. 4,517,650, issued May 14, 1985 to a J. M. Gomes et al. After the sheets 16 and inserts are inserted into an envelope, the envelope is sealed. Downstream from the sealing module is a printer 58, preferably an ink jet printer, that would print the zip plus four postal code in response to data read from the bar code symbol 18.

Although this invention has been described with a code 39; it will be appreciated that other bar codes could be used equally well, included code 11, code 2 of 5, the Nixdorf code, EAN-13, EAN-8, as well as other types of commercially known bar codes.

Figure 6A:
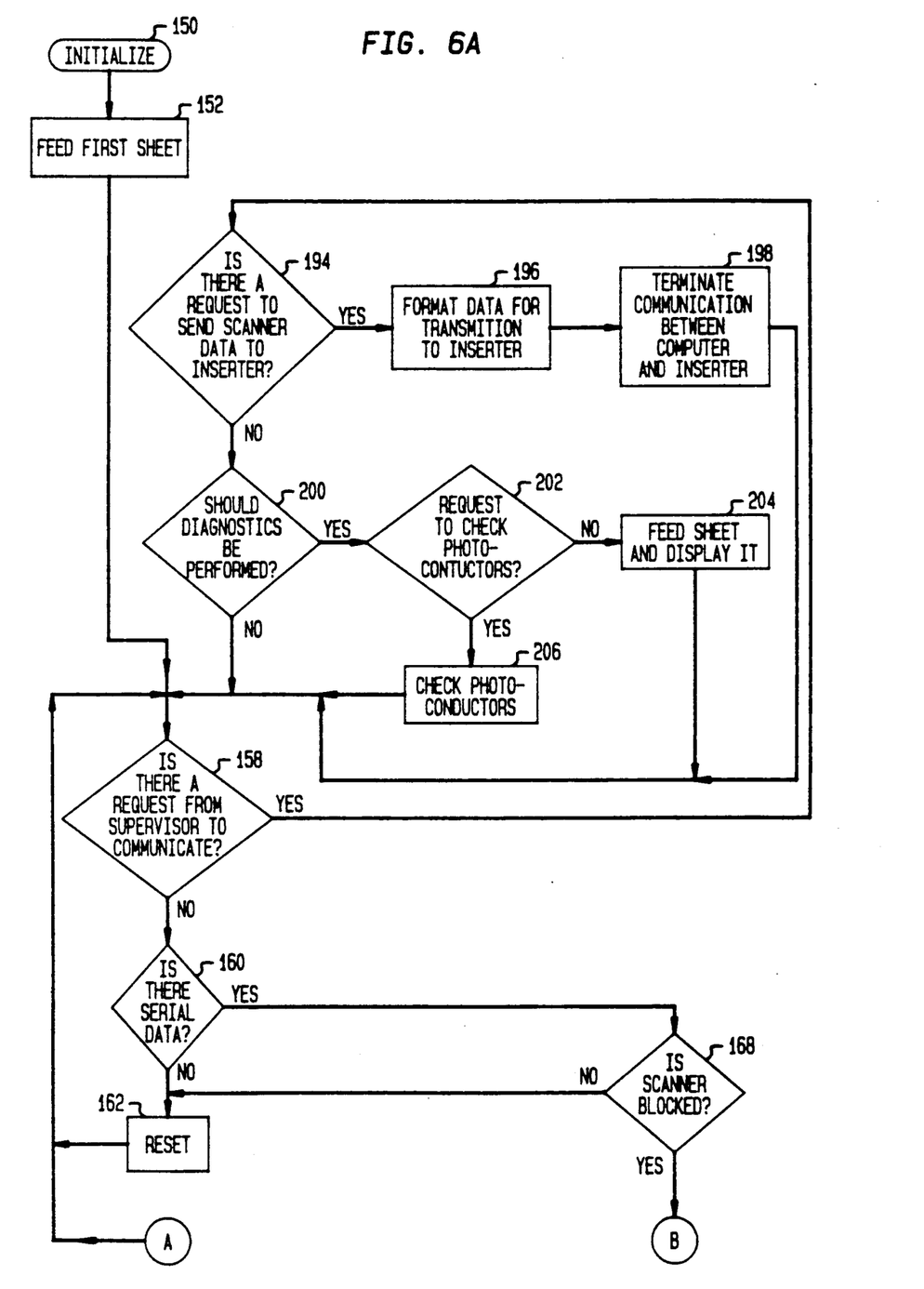
FIGS. 6a and 6b show a flow chart representative of the program for the apparatus shown in FIGS. 1-4.
Figure 6B:
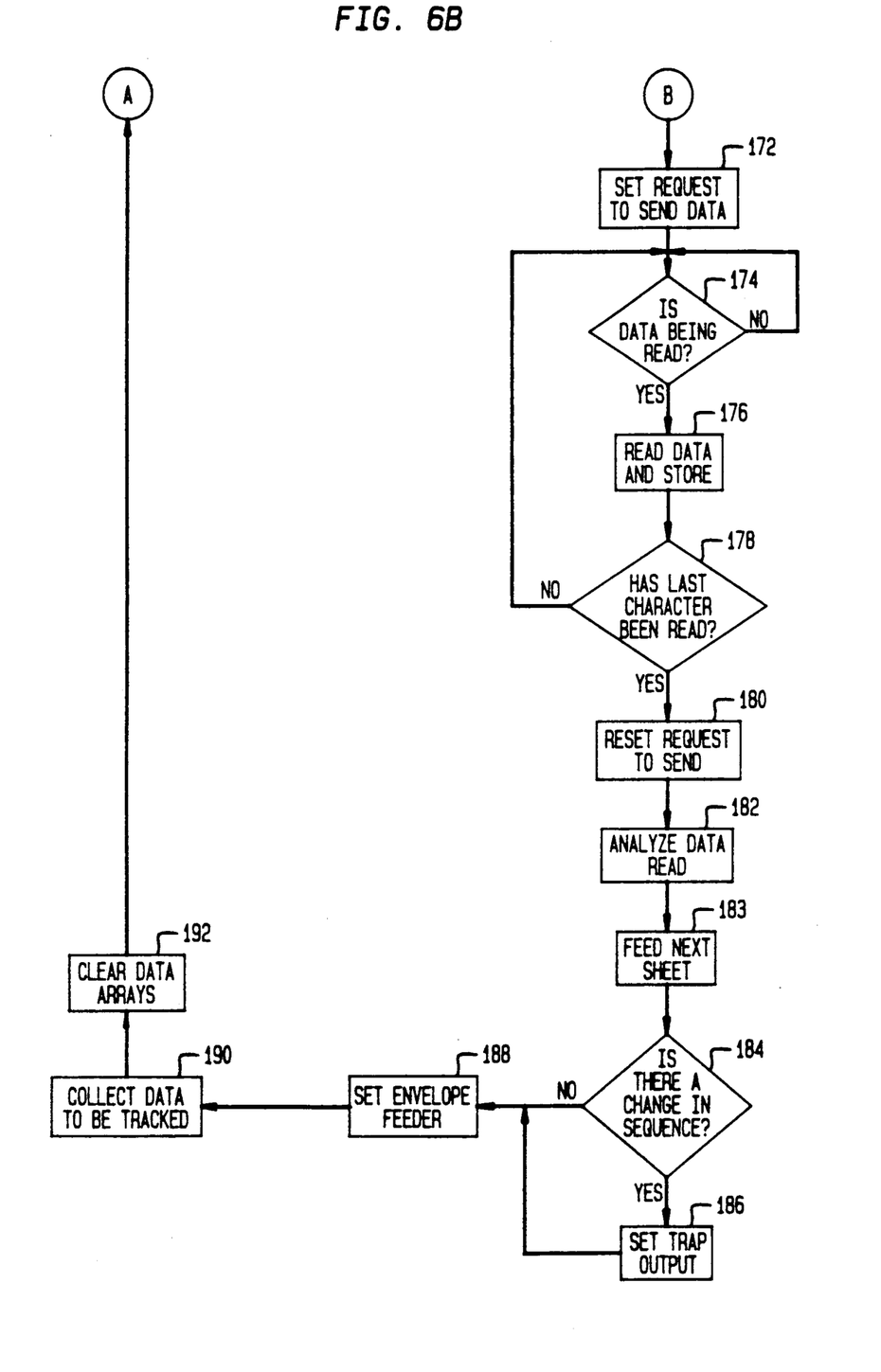

A description of the program used to operate the system shown in FIGS. 1-3 is given with reference to FIGS. 6A and 6B. The system is first initialized 150 thereby initializing the inserter system 10, the decoder 28 and the computer 32. Once the components of the system are initialized, a first sheet is fed 152 and an inquiry is made whether there is a request by the supervisor 40 to be communicated to the computer 158. If there is no request to be communicated, an inquiry is made whether there is serial data 160. If there is no such serial data, the system is reset 162. If there is serial data, the question is asked whether the scanner is blocked 168. If the scanner is not blocked, then there is a reset 162. If the scanner is blocked, then the request to send data is set 172 and the question is asked whether data is being read 174. If data is not being read, there is a return. If data is being read, the command is given to store the data 176. After the data has been read and stored, the question is asked if the last character been read 178. If not, there is a return back to the inquiry of whether the data is being read 174. If the last character has been read, a request to send is reset 180 and the data read is analyzed 182. After the data is analyzed the next sheet is fed 183 and the question is asked whether there is a change in the sequence of the data read 184. If there is, then a trap output is set 186. If the sequence is not the same, then the envelope feeder is enabled 188 and data to be tracked is collected 190. This completes the processing of a sheet and the shift data arrays are then cleared 192 and there is a return to the beginning of the cycle.

If there is a request by the supervisor 40 to communicate 158 with the computer 32, the question is then asked is there a request to send scanner data to the inserter 194. If the answer is yes, the data is formatted for transmission to the inserter 196, and then this data is communicated between the computer 32 and the inserter 198. Thereafter, there is a return to request to send 158. If there is no request to send scanner data to the inserter 194, the question is asked should a diagnostic be performed 200. If there is no such request, there is a return to the communication request query 158, but if there is such request, the question is then asked if there is a request to check the photodetectors 202. If the answer is no, then a command is given to feed the sheet and display it 204. Following this, there is a return, but if there is a request to check the photodetectors 57, the sensors are checked 206, and there is a return to the communication request 158.

The above program illustrates a sequence wherein sheets are being fed by the sheet feeder 16. Clearly, the process must be stated, and this is accomplished through the control supervisor 40 in cooperation with the computer 32. The supervisor 40 will cause the sheet feeder 16 to be enabled upon input from the keyboard 34. After this initial feeding, the scanner 24 will control the subsequent feeding in cooperation with the computer 32.

Thus, what has been described is a apparatus and method whereby sheets having a bar code symbol thereon can be in motion and the bar code symbol thereon can be read. This results in a faster processing of such sheets with a scanner of fewer parts with an attending reduced cost and greater reliability. This is particularly true when compared with a flying spot scanner. Another advantage of the fixed beam scanner of this invention when compared to a flying spot scanner is that the fixed beam scanner has a greater depth of field. In a flying spot scanner, the beam has an accurate motion that results in a decrease in depth of field. Clearly, this drawback is not present with a fixed beam scanner.

Although the invention has been described in processing a stack of cut sheets, it will be appreciated that a web of sheets can also be processed with the web being ruptured to obtain individual sheets.

What is claimed is:

1. An apparatus for reading a bar code symbol on a full sheet, the combination comprising:
   feeding means for feeding a sheet at a speed of at least 120 inches/sec,
   a fixed beam scanner positioned to scan the bar code symbol on a sheet as a sheet is fed from said support means,
   decoding means in communication with said scanner for decoding the bar code scanned by said scanner, and
   a computer in communication with said decoder means.

2. The apparatus of claim 1 wherein said fixed light beam scanner generates a light beam that has a width at the location of said bar code symbol that is less than the shortest distance between adjacent bars of said bar code symbol.

3. The apparatus of claim 2 wherein said scanner has an elongated window to thereby direct an elongater beam toward said bar code symbol.

4. The apparatus of claim 3 wherein said fixed beam light scanner is oriented in a position to direct said elongated beam upon said bar code symbol parallel to the bars on said bar code symbol.

5. The apparatus of claim 4 wherein said window is elliptical.

6. The apparatus of claim 3 wherein the width of said elongated beam is less than the smallest distance between bars of said bar code symbol.

7. The apparatus of claim 1 wherein said computer is in communication with an inserter system.

8. In a method of reading a full bar code symbol on a sheet, the steps comprising:
   feeding a full bar code symbol bearing sheet, at a speed of at least 120 in/sec,
   reading the bar code symbol on the sheet when the sheet is moving, and
   supplying the information read from the sheet to a decoder.

9. The method of claim 8 including the step of directing an elongated beam of light onto said bar code symbol during said decoding step.

10. The method of claim 8 including the steps of:
    decoding the information supplied to the decoder,
    supplying the decoded information to a computer, and
    controlling an inserter system in response to the decoded information.

11. In a method of reading a full bar code symbol on a sheet, the steps comprising:
    stacking a plurality of sheets, each of the sheets having a full bar code symbol thereon,
    feeding a sheet sequentially from the stack past a bar code reader at a speed of at least 120 in/sec, reading the bar code symbol on the feed sheet, and
supplying the information read from the sheet to a decoder.

12. The method of claim 11 including the step of directing an elongated beam of light onto said bar code symbol during said reading step.

13. The method of claim 12 including the steps of:
decoding the information supplied to the decoder,
supplying the decoded information to a computer, and
controlling an inserter system in response to the decoded information.

14. The method of claim 13 including the step of controlling the size of the light beam image directed upon said bar code symbol so that the width of the light image on the bar code symbol is less than the smallest distance between adjacent bars of the bar code symbol.

15. The method of claim 14 including directing the elongated beam onto the bar code symbol so that the length of said light image is parallel to said bars.

16. The method of claim 15 including the step of generating an elliptical light beam.

* * * * *